(12) United States Patent
Heer et al.

(10) Patent No.: US 9,842,112 B1
(45) Date of Patent: Dec. 12, 2017

(54) SYSTEM AND METHOD FOR IDENTIFYING FIELDS IN A FILE USING EXAMPLES IN THE FILE RECEIVED FROM A USER

(71) Applicant: Trifacta, Inc., San Francisco, CA (US)

(72) Inventors: Jeffrey Heer, San Francisco, CA (US); Sean Philip Kandel, San Francisco, CA (US)

(73) Assignee: Trifacta, Inc., San Francisco, CA (US)

( * ) Notice: Subject to any disclaimer, the term of this patent is extended or adjusted under 35 U.S.C. 154(b) by 282 days.

(21) Appl. No.: 14/525,082

(22) Filed: Oct. 27, 2014

Related U.S. Application Data

(60) Provisional application No. 61/895,948, filed on Oct. 25, 2013, provisional application No. 62/039,022, filed on Aug. 19, 2014.

(51) Int. Cl.
    G06F 17/30 (2006.01)
    G06F 17/27 (2006.01)
(52) U.S. Cl.
    CPC .... *G06F 17/30082* (2013.01); *G06F 17/2705* (2013.01); *G06F 17/30106* (2013.01)

(58) Field of Classification Search
    CPC ......... G06F 17/30082; G06F 17/30106; G06F 17/21; G06F 17/2705
    See application file for complete search history.

(56) References Cited

U.S. PATENT DOCUMENTS

| 2014/0201229 A1* | 7/2014 | Kirazci | G06F 17/30643 707/767 |
| 2014/0310225 A1* | 10/2014 | Huang | G06N 5/025 706/48 |

OTHER PUBLICATIONS

Soderland ("Learning Information Extraction Rules for Semi-Structured and Free Text", 1999, Machine Learning 34, pp. 233-272.*

* cited by examiner

*Primary Examiner* — Rehana Perveen
*Assistant Examiner* — Alexander Khong
(74) *Attorney, Agent, or Firm* — Fenwick & West LLP

(57) ABSTRACT

A system and method parses one or more fields from a file by receiving example locations of the field in the file, fashioning rules that describe the field from the locations, and then scoring the rules against some or all of the file.

15 Claims, 3 Drawing Sheets

SYSTEM AND METHOD FOR IDENTIFYING FIELDS IN A FILE USING EXAMPLES IN THE FILE RECEIVED FROM A USER

RELATED APPLICATIONS

This application claims the benefit of U.S. Provisional Patent Application Ser. No. 61/895,948, entitled, "Method and Apparatus for Identifying Fields in a File Using Examples In The File Received From a User" filed on Oct. 25, 2013, by Jeffrey Heer and Sean Kandel and U.S. Provisional Patent Application Ser. No. 62/039,022, entitled, "Method and Apparatus for Identifying Fields in a File Using Examples In The File Received From a User" filed on Aug. 19, 2014, by Jeffrey Heer and Sean Kandel, and the subject matter of this application is related to the subject matter of U.S. Provisional Patent Application Ser. No. 61/880,019 entitled, "Method and Apparatus for Identifying Delimiters in a Computer File" filed on Sep. 19, 2013 by Aaron Elmore, Adam Silberstein, Joseph Hellerstein and Sean Kandel, each having the same assignee as this application and each is incorporated herein by reference in its entirety.

FIELD OF THE INVENTION

The present invention is related to computer software and more specifically to computer software for parsing one or more fields from a file.

BACKGROUND OF THE INVENTION

Parsing a file into fields allows a file to be manipulated on a field by field basis. It can be difficult to parse a file into one or more fields when the same field can have different lengths across different rows, and the fields in the file are not identified using a delimiter. What is needed is a system and method that can allow one or more fields in a file to be parsed.

SUMMARY OF INVENTION

A system and method parses the file into multiple rows, and selects a subset of the rows from the file. Some or all of the subset of rows are displayed to the user and the user is allowed to highlight the fields in one or more of the rows of the subset, but the user highlights much fewer than all of the rows of the subset. The file may be a file in which the fields are not delimited by one or more characters and the length of some or all fields may be variable.

The system and method splits the text from each row in which a selection was made into a 'before element' to the left of the user's selection, the 'selected element' corresponding to the user's selection, and an 'after element' to the right of the user's selection.

The rows from the subset are tokenized to identify character and number strings, and certain identifiable formats such as phone numbers or URLs, and one or more rules may be identified from the characters and/or tokens in each element that describe each element in the rows in which a selection was made. Permutations of these rules are assigned to different pattern sets, and each pattern set is applied to all of the rows in the subset. If a sufficient measure of matches are found from the application of a pattern set, three scores are assigned to the pattern set: a score that indicates the regularity of matches among the rows of the subset, a score that indicates the number of times a match is found in a row in the subset or a row in the subset in which any match was found, and a score that indicates how uniform the number of matches per row is across all of the rows of the subset, or all of the rows in which a match was found. The scores are weighted and summed or otherwise numerically combined, sorted by total score, and pattern sets with similar or identical results or scores may be removed from consideration or may be moved down in sorted order based on how complex the rules of the pattern set are, as identified by a complexity schema that is received.

Rules from the N highest sorted pattern sets are displayed to the user in a human readable format, and the user may choose any of the pattern sets, view the rules and see the results of attempting to match the subset rows based on those rules, for example, by displaying the subset with the matches from the rule chosen. The user can then select a different pattern set and see the matches for that pattern set, add new selections, start over with new selections, or pick one pattern set. The rule or rules from the pattern set the user picked are then used to parse the field from the entire file. The process may be repeated for any number of fields. The parsed field or fields may be used as input to a program that did not generate the file.

DETAILED DESCRIPTION OF A PREFERRED EMBODIMENT

Figure 1:
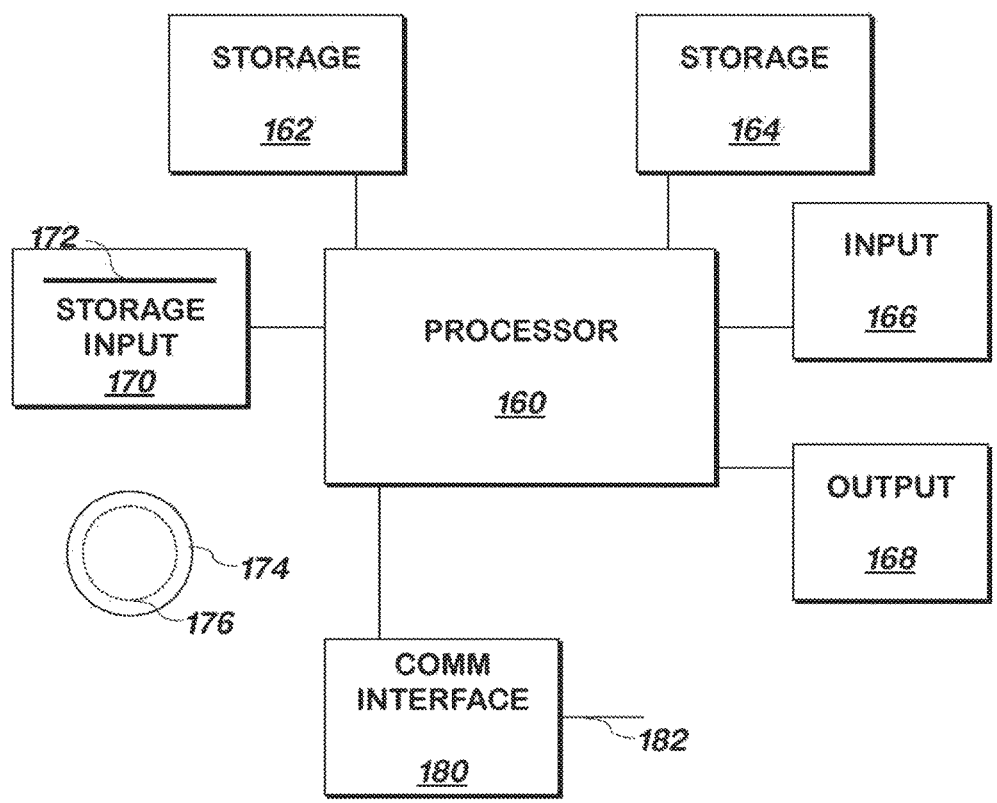
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, California or INTERNET EXPLORER browser commercially available from MICROSOFT above, although other systems may be used. Each computer system 150 may be a SAMSUNG GALAXY NEXUS III commercially available from SAMSUNG ELECTRONICS GLOBAL of Seoul, Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2:
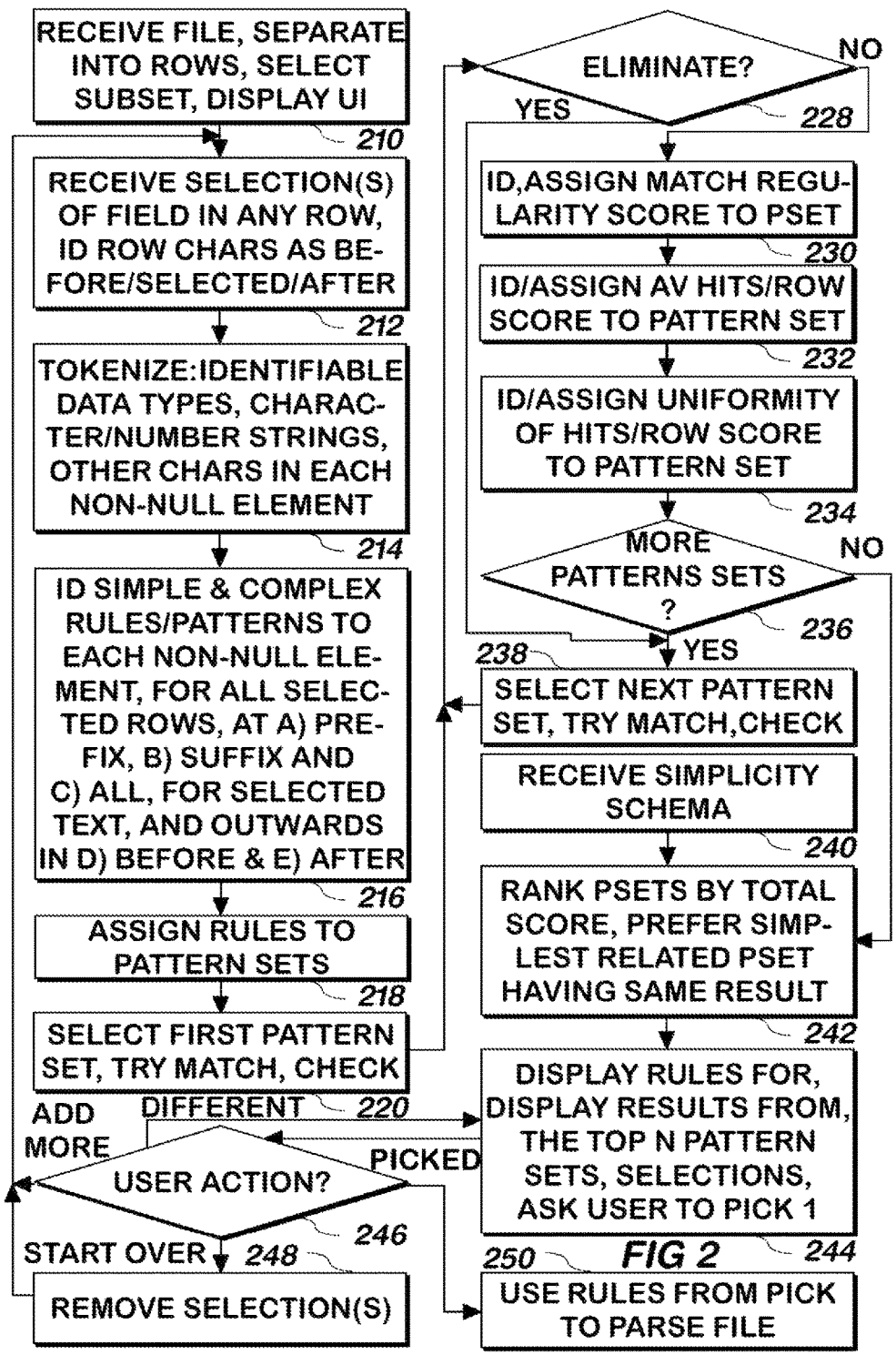
FIG. 2, is a flowchart illustrating a method of parsing one or more fields in a file according to one embodiment of the present invention.

Referring now to FIG. 2, a method of producing a set of one or more rules to identify a field in a file of multiple rows, each containing one or more fields, is shown according to one embodiment of the present invention. A file is received, parsed into rows, and a subset (e.g. the first 1000) of the rows is selected 210. The subset may include all of the file or less than all of the file. As part of step 210, a user interface is displayed to allow a user to select one or more contiguous characters in each of one or more subsets of rows, for example by highlighting some of the characters in a row, for example, by dragging a mouse across such characters. Each of the contiguous characters in a row identifies all of the characters in a field in that row.

Once such selection of characters that define a field in each of one or more rows is received, the characters in the row are identified as either being part of the selection, characters before the selection, i.e. those to the left of the selection, and characters after the selection, i.e. those to the right of the selection 212. Such characters are referred to as the selected element, before element, and after element, respectively. In each row in which a selection is made, the characters before or after the selection may be a null set of characters.

A tokenized version of the file is created using the subset 214. In one embodiment, the tokenized version of the file includes, for each row in which a selection was made, a set of before tokens, a set of selected tokens, and a set of after tokens corresponding to the before element, the selected element, and the after element, respectively. In one embodiment, if the before or after characters are null, the corresponding token is a null token.

For example, contiguous sets of numbers are represented by a number token, and contiguous sets of non-numeric characters are represented by a string token. Strings of one or more lower case letters (and either numbers or no numbers in such strings) may be identified by a lower case string token. Strings of one or more upper case case letters (and either numbers or no numbers in such strings) may be identified by an upper case string token. Additionally, common data types are also represented by tokens, for example, state codes, such as CA for California, may be represented by a state code token. Other data types that are represented by tokens may include zip codes, phone numbers, URLs, and IP addresses. The user may define their own token types using definitions or custom text patterns with wildcards and the like. Any number of token types may be assigned to the same data. It is thus possible that a contiguous set of numbers would be represented by both a number token, and a zip code token, for example. An IP address may be represented by an IP address token, as well as several number tokens and string tokens. Other tokens may include letter tokens for each letter, whether capitalized or not.

Any number of rules may be identified that describe each element 216. For example, a rule may describe an element as always being null. The rules may be identified using conventional regular expression identification techniques.

In one embodiment, such rules may describe the tokens as well as the characters of each element. For example, if the selections in each of some of the rows spell Alabama, and the selections in other rows spell Alagama, one rule is that the selection is a string of characters, which may be identified from the tokens corresponding to such selections. Another rule may be that the selection starts with the letters 'Ala' and ends with the letters 'ama', which may be identified from the characters selected in the subset of the file. Any number of rules may be identified for each element, and the rules may be simple or complex, as described in more detail below. In one embodiment, each rule identified for an element will correspond to all similar elements in rows in which selections were made. Thus, a rule for a before element will correspond to the before element of all rows in which a selection was made. In other embodiments, rules may be defined for a threshold percentage of the corresponding elements of the rows for which selections were received. Thus, if all of the selections contain nothing but the word 'Alabama', but one row contains the word 'Alagama', one rule identified may be that the selection contains the word 'Alabama'.

In one embodiment, to create rules, each element is analyzed in one or more directions. In one embodiment, the selected portion is analyzed to identify a prefix, a suffix, and a rule for the entire selected element. To analyze the prefix, letters and/or tokens common to all, or a threshold percentage of, similar elements are identified from the left side of the selected element towards the right. In the example above, with selected portions that contain Alabama and Alagama, analyzing the selected element from the left to the right would identify that the first three letters of all of the selected elements start with 'ala'. Analyzing the selected portion from the right to the left would identify that the last three letters of all of the selected elements in with 'ama'. Analyzing the entire selected element would identify that all of the selected elements contain a character string, or a character string of seven letters. The before element and the after element, are analyzed in one direction, outward from the selected element, to identify rules for those elements as well.

In one embodiment, the user may highlight two sets of characters. In such embodiment, the after element of the leftmost set of characters selected extends only to (but not including) the leftmost character of the rightmost set of characters selected, and the before element of the rightmost set of characters extends only to just past the rightmost character of the leftmost set of characters selected, though in other embodiments, these restrictions are not made. Thus, the after element of leftmost set of characters can or include the before element of the rightmost set of characters, and the rules would apply to both sets of characters in each row.

The rules are assigned to pattern sets 218 using some or all different manners of permutations of the rules. In one embodiment, zero, one or two rules for the selected element and zero or one rule for each of the before and after elements are assigned to each pattern set, though other numbers of rules may be used. In the case of two selected element rules assigned to the pattern set, one of the two rules is for a prefix and the other of the two rules is for a suffix, though either may also be a single rule for the selected element assigned to a pattern set. So for example, if one rule was identified in the before and after elements and a prefix and suffix was identified for the selected element, a pattern set may include each of those four rules. If another rule was identified for the entire selected element, that rule and the rule identified for each of the before element and the after element may be assigned to a different pattern set. If there were two rules assigned to the entire selected element, such as one rule identifying a string of characters and another rule identifying state codes, each rule would be assigned to a different pattern set. If a prefix and a suffix is identified for the selected element, one rule may include one of the prefix and suffix and a different rule may include the other of the prefix and suffix.

The first pattern set is selected and an attempt is made to use the rule to identify matching rows in the entire subset selected in step 210, and a check is made to determine whether a threshold percentage of the rows match all of the rules in the pattern set selected 220. If a threshold percentage of the rows in the subset do not match all of the rules in the selected pattern set 228, the pattern set is eliminated, and the method continues at step 238. Otherwise 228 the method continues at step 230.

At step 230, a batch regularity score is assigned to the pattern set. To assign a batch regularity score to the pattern set, the number of non-matching rows between rows that matched the selected pattern set in step 220 or step 236 below is identified for each pair of rows nearest to one another. For example, if row number one and row number four match the pattern set, but row number two and row number three do not, then the pair of rows including row number one and row number four are separated by two non-matching rows. A measure of variability, such as standard deviation, is applied to all of the differences and that match regularity score is assigned so that if matches are made in a perfectly repeating pattern, for example every three rows, a match regularity score will be high, and if matches with the pattern set are made in a completely random pattern, the match regularity score will be low.

An average number of hits per row score is assigned 232 to the selected pattern set, based on the number of matches (of step 220 or 236) the selected pattern set has with each row, or with each row that has at least one match. A lower number of average matches per row, or per row that has at least one match, causes a higher average number of hits per row score than one that has a higher number of average matches per row, or per row that has at least one match. In one embodiment, if such average is below one or one, the average number of hits per row score may be significantly higher than if such average is just above it.

In one embodiment, a hit occurs for each match that occurs in a row. In another embodiment, a hit occurs when a match does not occur, thus hits are inversely proportional to matches. A row with no matches would be considered to have one hit and a row with one or more matches would be considered to have no hits, when computing the hits per row score.

In one embodiment, having a single match per row, but not above it, can indicate that the pattern set corresponds to nearly every row, and thus, the field the user is attempting to identify is accurately described. When the number of matches per row is much below one, the pattern set may be too specifically tailored to the rows in which the user's selections were made to identify all of the instances of the field the user is attempting to specify, in each row. When the average number of matches per row is above one, the pattern set may be too generally specified, and may locate things other than the field the user is attempting to specify. In the other embodiment in which hits are inversely proportional to matches, having no hits per row, i.e. nothing doesn't miss, is optimal.

A uniformity of hits per row score is assigned 234 to the selected pattern set, based on the deviation (e.g. using the standard deviation or another measure of deviation) from the average of the number of matches (of step 220 or 236) the pattern set has with each row or with each row that has at least one match. A more uniform number of matches across all rows, or all rows that have at least one match, causes a higher uniformity of hits per row score than one that has a less uniform number of average matches across all rows, or all row that have at least one match.

If there are more pattern sets that have not been analyzed as per steps 230-234 236, the next pattern set is selected, an attempt is made to match it to the rows in the subset, and the percentage of matched rows is checked as described above 238, and the method continues at step 228 using the newly selected pattern set. Otherwise 236, the method continues at step 242.

Before the first iteration of step 242, a simplicity schema is received 240. A simplicity schema provides information that can be used to determine which of two pattern sets is the simplest. For example, a pattern set with a rule that applies to the entire selected element may be considered to be simpler than a pattern set that uses a suffix and a prefix. In one embodiment, a pattern set with more specific rules and fewer general rules is considered simpler than pattern sets with fewer specific rules, and more general rules. General rules are those specifying strings of numbers or characters, while specific rules are those that identify specific types of data, such as phone numbers, state codes, IP addresses, URLs, etc. In another embodiment, pattern sets with more general rules are considered simpler than pattern sets with more specific rules. The schema may or may not provide a set of scoring criteria to use to assign a simplicity score to each pattern set.

A total score is computed for each pattern set, the pattern sets are sorted by total score and simple pattern sets are preferred over more complex related pattern sets 242. The total score may be the sum of the three scores identified in steps 230-234. In one embodiment, the three scores have a range that starts at zero, but ends at different numbers, with the ending number of the score of step 230 highest, and the score of step 234 lowest, though in another embodiment, the ranges of scores are the same and different weights are applied to the three scores, with the weight applied to the score of step 230 highest and the weight applied to the score of step 234 lowest. Other types of numeric combinations of scores and other numbers of scores may be used, including additional scores, which are incorporated into the total score. Related pattern sets have the same or nearly the same matches in one embodiment, or the same or nearly the same three scores above in another embodiment. In one embodiment, preferring a pattern set over another pattern set may mean eliminating the non-preferred pattern set, or lowering its total score, optionally in proportion to the simplicity score if such a score was assigned, which may be performed as part of step 242 using the simplicity schema.

Rules from the top N (e.g. N=5) pattern sets are displayed to a user in a human readable format, and the user is allowed to indicate (e.g. by moving a cursor) each displayed pattern set or pick the rules from a pattern set 244. When the user indicates one of the displayed pattern set, the pattern set is applied to the subset, and the subset is displayed to the user, with matches from the indicated pattern set in the subset being highlighted. The user may indicate rules from a different pattern set, start over, add more selections, or pick a pattern set to use for parsing the file via a user action.

If the user action is to indicate a different pattern set 246, the method continues at step 244 with matches from the indicated pattern set highlighted in the subset of the file. If the user action is to start over 246, the selections received previously are removed 248 and the method continues at step 212. If the user action is to add another selection 246, the method continues at step 212, with one or more selections received being added to the prior selections received. If the user action is to pick the indicated or other pattern set 246, the rules from the picked pattern set are used to parse the field in the file.

System.

Figure 3:
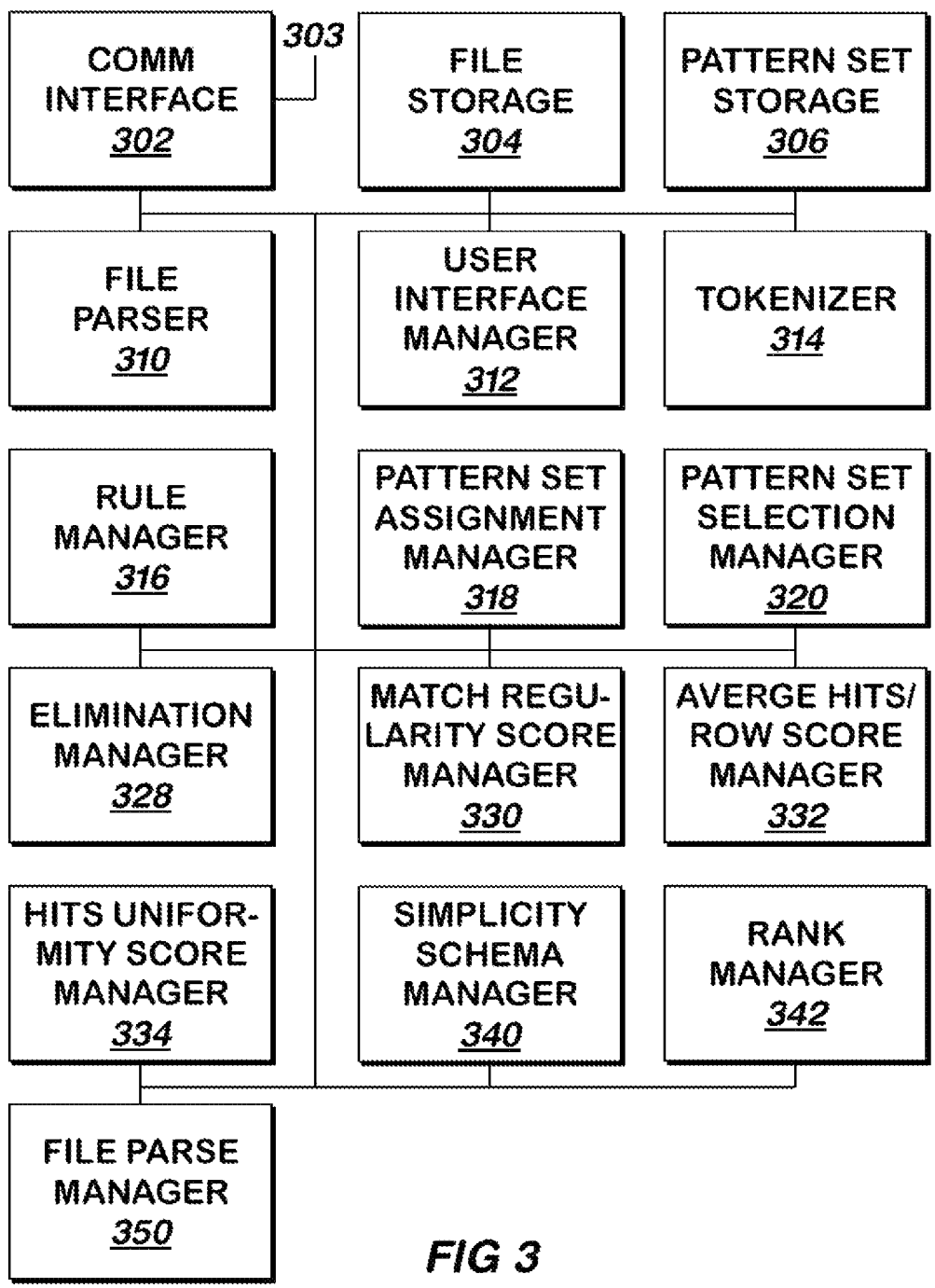
FIG. 3 is a block schematic diagram of a system for parsing one or more fields in a file according to one embodiment of the present invention.

Referring now to FIG. 3, a system for creating rules to parse a field from a file is shown according to one embodiment of the present invention.

Communication interface 302 includes a conventional communication interface running suitable communication protocols such as Ethernet, TCP/IP, or both. In one embodiment, unless otherwise noted herein, all communication in or out of the system of FIG. 3 is made via input/output 303 of communication interface 302. Input/output 303 may be coupled to an Ethernet, the Internet, or both.

File parser 310 receives the file, separates the file into rows using conventional techniques, stores the file into file storage 304 and signals user interface manager 312. When signaled, user interface manager 312 selects a subset of the file as described above, and displays the subset or some or all of the subset onto a computer display screen or other display device (not shown), on which all output of user interface manager is displayed. User interface manager 312 provides a user interface that allows the user to highlight characters in the displayed subset as described above and receives locations of such highlighted characters. For each contiguous set of highlighted characters in the row user interface manager 312 builds a row object with a row identifier, and a start and end position that defines the start and end of the selected characters in that row, and stores the row object into file storage 304. User-interface manager 312 allows the user to indicate that the user is finished making such selections, and when such an indication is received, user-interface manager 312 signals tokenizer 314.

When signaled, tokenizer 314 tokenizes the rows corresponding to the row objects as described above by identifying tokens corresponding to the characters in the row, and storing tokens in each row object in file storage 304 with an indication of the location of the beginning and end of the token in the row. In one embodiment, a token may not span more than one element as described above. In one embodiment, the characters from the row are also stored in the row object by tokenizer 314. When it has finished tokenizing the rows in which the user made a selection, tokenizer 314 tokenizes the remaining rows in the subset, builds row objects for such rows, adds the token information to the rows as described above, stores the row objects into file storage 304 and signals rule manager 316.

When signaled, rule manager 316 identifies rules that correspond to the row objects as described above and stores the rules into pattern set storage 306, along with unique identifiers it assigns to each rule and an indication as to whether the rule applies to the before element, selected element or after element. When rule manager 316 has identified and stored all of the rules, rule manager 316 signals pattern set assignment manager 318.

When signaled, pattern set assignment manager 318 assigns all permutations of rules to pattern sets as described above, and stores a unique identifier of the pattern set that it assigns, and identifiers of the rules assigned to that pattern set, into pattern set storage 306 for each pattern set. Pattern set assignment manager 318 then signals pattern set selection manager 320.

When signaled, pattern set selection manager 320 selects the first pattern set and applies the pattern set to the subset of the file and to the row objects for the subset in file storage 304 to determine if there are any matches of the pattern set with the rows in the subset and the row objects. Pattern set selection manager 320 builds a match object containing, the identifier of the pattern set, and, for all rows in which a match of the pattern set is found: the number of matches in the row, the identifier of the order of the row, the number of rows preceding the row in which no matches were found and the start and end character positions of each of the one or more matches in the row. Pattern set selection manager 320 provides the match object to elimination manager 328.

When it receives the match object, elimination manager 328 determines the percentage of rows that matched the pattern set, and if the percentage does not exceed a threshold (e.g. 10%), elimination manager 328 signals pattern set selection manager 320 with an indication to select a different pattern set, and otherwise, provides the pattern set to match regularity score manager 330.

When it receives the match object, match regularity score manager 330 uses it to compute the match regularity score as described above with respect to step 230 of FIG. 2, stores the match regularity score into the match object, and provides the match object to average hits per row score manager 332.

When it receives the match object, average hits per row score manager 332 uses it to compute the average hits per row score as described above with respect to step 232 of FIG. 2, stores it into the match object and provides the match object to hits uniformity score manager 334.

When it receives the match object, hits uniformity score manager 334 uses it to compute the hits uniformity score as described above with respect to step 234 of FIG. 2, sums the hits uniformity score with the other two scores stored in the match object as described above, optionally after weighing each of them as described above, and stores the result as the total score into the pattern set object stored in pattern set storage 306 corresponding to the pattern set identifier in the match object. Hits uniformity score manager 334 additionally stores the hits uniformity score into the match object and stores the match object into the pattern set object in pattern set storage 306 for use in preferring pattern sets with simpler rules as described below. Hits uniformity score manager 334 then signals pattern set selection manager 320 with an indication to select a different pattern set.

When pattern set selection manager 320 is signaled with an indication to select a different pattern set, pattern set selection manager 320 determines if there are more pattern sets not yet selected. If so, it selects the next pattern set, and applies the newly-selected pattern set to the subset of the file and to the row objects for the subset in file storage 304 to determine if there are any matches of that pattern set with the rows in the subset and the row objects. Pattern set selection manager 320 builds a match object containing, the identifier of the newly selected pattern set, and, for all rows in which a match of that pattern set is found: the number of matches in the row, the identifier of the order of the row and the number of rows preceding the row in which no matches were found. Pattern set selection manager 320 provides the match object to elimination manager 328, and the process described above is repeated. This process will be repeated for all pattern sets. When there are no more pattern sets not already selected, pattern set selection manager 320 signals rank manager 342.

At any time before rank manager 342 is signaled, a user or other party may supply a simplicity schema to simplicity schema manager 340. The simplicity schema contains information that describes which rules are considered simpler than other rules as described above. A simpler rule may not actually be simpler by any particular objective measure, but is used as described herein to provide a preference to one pattern set over another if the pattern sets provide similar or identical results or have similar or identical scores. Simplicity schema manager 340 stores the simplicity schema into pattern set storage 306.

When signaled, rank manager 342 sorts the pattern sets by total score, and then either lowers the sorted order or eliminates from its ranking, related pattern sets having the same or nearly the same result (in their match objects stored in pattern set storage 306) or the same or nearly the same three scores (in such match objects). Pattern sets having the same result are those for which the matches for such pattern sets stored in their match objects of pattern set storage 306 are identical. Pattern sets having nearly the same result are those for which matches for such pattern sets stored in their match objects in pattern set storage are the same for at least a threshold percentage of matches, such as 99%. In one embodiment, a related pattern set is a pattern set that has the same rules for the before and after elements, but different rules for the selected element. In another embodiment, a related pattern set has the same rules for two of the three elements but different rules for the other element. Other methods of identifying related pattern sets may be used, for example having at least one rule in common or no rules in common (but have the same result). Rank manager 342 stores into pattern set storage 306 a list of the identifiers of the top N pattern sets it ranks and signals user interface manager 312.

When so signaled, user interface manager 312 retrieves the list of the top N pattern sets, and for each pattern set in the list displays a human readable version of the rules for the pattern set stored in the pattern set object for such pattern set in pattern set storage 306 and chooses the top ranked pattern set. User interface manager 312 provides a user interface that allows the user to choose a different pattern set.

User interface manager 312 displays some or all of the rows from the subset of the file stored in file storage 304 and highlights the matched text on the displayed rows using the match object for the chosen pattern set. As the user chooses a different pattern set, user interface manager 312 unhighlights the highlighted text and highlights the matched text from the newly-chosen pattern set.

User interface manager 312 additionally provides a user interface to allow the user to select additional instances of the field on one or more of the displayed subset rows, and if such an additional selection is made, user interface manager 312 adds the selection to the row object for the row or rows on which a selection is made in file storage 304, and signals tokenizer 314, thereby restarting the entire process described above for the previously-received and newly-received selections. In one embodiment, if the user selects a portion of a row that already has a selected element, the newly selected portion of the row is used by user interface manager 312 to replace the previously-selected element in the row object for the row.

User interface manager 312 additionally provides a user interface to allow the user to start over. If the user uses the user interface to indicate that the user wishes to start over, user interface manager 312 removes some or all of the information other than the file in file storage 304 and some or all of the information in pattern set storage 306 and allows the user to restart the process of making one or more selections, storing the selections in the row objects for the rows on which selections were made in file storage 304. When the user indicates the user is finished making selections, user interface manager 312 signals tokenizer 314, thereby restarting the entire process described above for the newly received selections.

User interface manager 312 additionally provides a user interface to allow the user to pick one of the pattern sets to use to parse the field from the file. If the user picks one of the pattern sets, user interface manager 312 provides the identifier of the pattern set picked by the user, to file parse manager 350. File parse manager 350 uses the pattern set having the identifier it receives to parse the field from the file. File parse manager 350 may generate a new file containing that field, and optionally other fields that were identified and parsed in the same manner as described herein, and stores the new file into file storage 304, which may include conventional storage, such as conventional memory or disk storage. If there are multiple fields, the field boundaries may be identified in the new file using conventional techniques, such as delimiters by file parse manager 350. The new file may be used as input to a first program (not shown) that is different from a second program (not shown) that was used to generate the file received by file parser 310. The first program may therefore analyze some or all of the output of the second program.

Any number of fields may be specified as described herein to file parse manager 350 to allow it to parse multiple fields in a single pass of the file.

As noted, multiple sets of characters may be selected for each row, and such selected characters may be added to a single row object or multiple row objects, and processed as described herein.

It is noted that the process of providing a visualization of the data from a file, for example, by displaying some of the rows of the file, receiving an ambiguous interaction from the user, such as the selection of sets of characters in one or more rows that do not actually specify exactly the results the user wishes to obtain, providing one or more predictions of the specification of the results the user wishes to obtain using the ambiguous interaction received from the user, for example, by supplying multiple potential pattern sets, allowing the user to disambiguate the prediction, for example, by selecting one of the pattern sets, supplying additional selection information or starting over, receiving such disambiguation, and then providing an applying the results when the user is satisfied with the prediction selected, by using the selected predicted result, may be applied to other areas outside of the scope of text pattern definition. Such other areas may include those involving a domain specific language, a computer language designed to assist in addressing a specific problem domain or transformation and/or those involving a visual representation used to solve a problem or transform data. Such areas may include data deduplication, data integration, large scale graph processing, modeling and visualization, statistical modeling tools, and transformation and processing of unstructured data types such as photos and/or videos.

Summary

There is shown a method of parsing a field in two or more portions of a file, including: receiving an identification of a subset in each of some, but not all, of the two or more portions of the file; identifying at least one rule or pattern that describes all of the at least some, but not all, of the portions of the file in which the identification of the subset was made, each said at least one rule or pattern describing one selected from a first set, including: A) a part, if any, of the portion that is before the subset; B) a part of the portion that comprises the subset; and C) a part, if any, of the portion that is after the subset; assigning different permutations of at least one of the rules or patterns to each of two or more pattern sets; for each pattern set, assigning at least two of a second set including: D) a score responsive to how regularly said pattern set appears in at least some of the file; E) a score responsive to the ratio of a number times the pattern set corresponds to a different portion of the file in at least some of the file to a number of all portions in said some of the file; and F) a score responsive to a number of times said pattern set corresponds to portions in at least some of the file; selecting two or more fewer than all of the two or more pattern sets responsive to the at least two scores assigned; providing for display, results of an application of each of the selected plurality of fewer than all of the two or more pattern sets to each of at least one portion of the file; receiving a selection of one of the selected plurality of fewer than all of the two or more pattern sets for which results were provided for display; and parsing the field in the file responsive to the one of the selected plurality of fewer than all of the two or more pattern sets for which results were provided for display, in each of the two or more the portions of the file.

The method includes an optional feature, whereby the at least one rule or pattern set that describes the part of the portion that comprises the subset comprises at least two of a third set including: G) a rule or pattern describing a leftmost portion of the subset; H) a rule or pattern describing a rightmost portion of the subset; and I) a rule or pattern describing all of the subset.

The method includes an optional feature, whereby: the first set includes at least one of components A and B; and at least one of component A and component B is identified using a direction outward from the subset.

The method includes an optional feature, whereby, for at least one of the two or more pattern sets, the selecting step or the displaying step is responsive to a type of at least one of the at least one rule or pattern assigned to the pattern set.

The method optionally additionally includes assigning at least one token representing at least one character in the file; and includes an optional feature, whereby at least one of the at least one rule or pattern is identified responsive to at least one token assigned.

The method optionally additionally includes displaying the pattern sets corresponding to the results displayed.

The method includes an optional feature, whereby the selecting the two or more fewer than all of the two or more pattern sets or the displaying the results step is additionally responsive to, for at least one of the two or more pattern sets selected or for which results are displayed, a measure of portions of the file to which said pattern set corresponds, and a threshold.

A system for parsing a field in two or more portions of a file is described, the system including: a file parser for parsing the file into the two or more portions and for providing the two or more portions of the file at an output; a user interface manager having an input coupled to the file parser for receiving at least some of the two or more portions of the file and for receiving an identification of a subset in each of some, but not all, of the two or more portions of the file, the user interface manager for providing at an output the identifications of the subset in each of the some, but not all, of the two or more portions of the file; a rule manager having an input coupled to the user interface manager output for receiving the identifications of the subset in each of the some, but not all, of the two or more portions of the file, and to the file parser for receiving at least said some of the two or more portions of the file, the rule manager for identifying and providing at an output at least one rule or pattern that describes all of the at least some, but not all, of the portions of the file in which the identification of the subset was made, each said at least one rule or pattern describing one selected from a first set, including: A) a part, if any, of the portion that is before the subset, B) a part of the portion that comprises the subset; and C) a part, if any, of the portion that is after the subset; a pattern set assignment manager having an input coupled to the rule manager output for receiving the at least one rule or pattern, the pattern set assignment manager for assigning different permutations of at least one of the rules or patterns to each of two or more pattern sets and for providing the two or more pattern sets at an output; at least two of a second set including: D) a match regularity score manager having an input coupled to the pattern set assignment manager for receiving the two or more pattern sets and to the file parser for receiving at least some of the portions of the file, the match regularity score manager for, for each pattern set, assigning a score responsive to how regularly said pattern set appears in at least some of the file corresponding to the at least some of the portions received at the match regularity score manager input and for providing each said score at an output; E) a hits uniformity score manager having an input coupled to the pattern set assignment manager for receiving the two or more pattern sets and to the file parser for receiving at least some of the portions of the file, the hits uniformity score manager for, for each pattern set, assigning a score responsive to the ratio of a number times the pattern set corresponds to a different portion of the file in at least some of the file corresponding to the at least some of the portions received at the hits uniformity score manager input to a number of all portions in said some of the file and for providing each said score at an output; and F) an average hits per row score manager having an input coupled to the pattern set assignment manager for receiving the two or more pattern sets and to the file parser for receiving at least some of the portions of the file, the average hits per row score manager for, for each pattern set, assigning a score responsive to a number of times said pattern set corresponds to portions in at least some of the file corresponding to the at least some of the portions received at the average hits per row score manager input, and for providing each said score at an output; a rank manager having an input to the outputs of each of the at least two of the second set for receiving the scores for each of the two or more pattern sets, selecting two or more fewer than all of the two or more pattern sets responsive to the at least two scores received at the rank manager input for each of the two or more pattern sets, the rank manager for providing at an output each of the two or more fewer than all of the pattern sets selected; and wherein: the user interface manager input is additionally coupled to the rank manager output for receiving the each of the two or more fewer than all of the pattern sets selected and to the pattern set assignment manager output for receiving the two or more pattern sets selected; the user interface manager is additionally for providing for display via the user interface manager output, results of an application of each of the two or more pattern sets selected received at the user interface manager input to each of at least one of the at least some of the two or more portions of the file received at the user interface manager input; the user interface manager input is additionally for receiving a selection of one of the selected plurality of fewer than all of the two or more pattern sets for which results were provided for display; and the user interface manager is additionally for providing at the user interface manager output said one of the selected plurality of fewer than all of the two or more pattern sets for which results were provided for display; and additionally including a file parse manager having an input coupled to the user interface manager output for receiving the one of the selected plurality of fewer than all of the two or more pattern sets for which results were provided for display, and to the file parser output for receiving the two or more portions of the file, the file parse manager for parsing the field in the file responsive to the one of the selected plurality of fewer than all of the two or more pattern sets for which results were provided for display, in each of the two or more the portions of the file, and for providing at an output a version of the two or more portions of the file with the subset parsed in two or more the two or more portions of the file.

The system includes an optional feature, whereby the at least one rule or pattern set that describes the part of the portion that comprises the subset comprises at least two of a third set including: G) a rule or pattern describing a leftmost portion of the subset; H) a rule or pattern describing a rightmost portion of the subset; and I) a rule or pattern describing all of the subset.

The system includes an optional feature, whereby: the first set includes at least one of components A and B; and the pattern set assignment manager identifies at least one of component A and component B using a direction outward from the subset.

The system optionally additionally includes a simplicity schema manager having an input coupled to the pattern set assignment manager output for receiving the two or more pattern sets, the simplicity schema manager for providing at an output, for each of the two or more pattern sets, wherein, for at least one of the two or more pattern sets, a simplicity indicator, responsive to a type of at least one of the at least one rule or pattern assigned to said pattern set; and includes an optional feature, whereby, at least one selected from the following: the rank manager input is additionally coupled to the simplicity schema manager output for receiving the simplicity indicator for each pattern set, and the rank manager selects the two or more fewer than all of the two or more pattern sets additionally responsive to the two or more simplicity indicators; the input of at least one of the match regularity score manager, hits uniformity score manager, and average hits per row score manager is additionally coupled to the simplicity schema manager output for receiving the simplicity indicator for each pattern set, and at least one of the match regularity score manager, hits uniformity score manager, and average hits per row score manager assigns the respective score for a pattern set additionally responsive to the simplicity indicator for said pattern set; and the user interface manager input is additionally coupled to the simplicity schema manager output for receiving the simplicity indicator for each pattern set, and the user interface manager provides for display the results of the application of each of each of at least one pattern set additionally responsive to the simplicity indicator for said pattern set.

The system optionally additionally includes a tokenizer having an input coupled to the file parser for receiving the two or more portions of the file, the tokenizer for assigning at least one token representing at least one character in the file and for providing, the at least one token assigned, at an output; and at least one of the match regularity score manager, hits uniformity score manager, and average hits per row score manager is additionally coupled to the tokenizer output for receiving the at least one token assigned, and at least one of the match regularity score manager, hits uniformity score manager, and average hits per row score manager assigns the respective score additionally responsive to the at least one token assigned.

The system includes an optional feature, whereby the user interface manager is additionally for providing at the user interface manager output a representation of the two or more fewer than all of the pattern sets selected corresponding to the each of the two or more fewer than all of the pattern sets selected.

The system: optionally additionally includes an elimination manager having an input coupled to the pattern set assignment manager output for receiving the two or more pattern sets, the elimination manager and to the file parser output, for receiving the portions of the file, the elimination manager for, for each of the two or more pattern sets, identifying a measure of portions of the file to which said pattern set corresponds, and for providing at an output, for each of the two or more pattern sets, an indicator, responsive to the measure and a threshold; and includes an optional feature, whereby at least one selected from: the rank manager input is coupled to the elimination manager output for receiving the indicator for each of the two or more pattern sets, and the rank manager selects the two or more fewer than all of the two or more pattern sets additionally responsive to at least one indicator for each of the two or more pattern sets; and the user interface manager input is coupled to the elimination manager output for receiving the indicator for each of the two or more pattern sets, and the user interface manager provides the results of each of the two or more pattern sets selected to at least one indicator for each of the two or more pattern sets.

A computer program product including a computer useable medium having computer readable program code embodied therein for parsing a field in two or more portions of a file is described, the computer program product including computer readable program code devices configured to cause a computer system to: receive an identification of a subset in each of some, but not all, of the two or more portions of the file; identify at least one rule or pattern that describes all of the at least some, but not all, of the portions of the file in which the identification of the subset was made, each said at least one rule or pattern describing one selected from a first set, including: A) a part, if any, of the portion that is before the subset; B) a part of the portion that comprises the subset; and C) a part, if any, of the portion that is after the subset; assign different permutations of at least one of the rules or patterns to each of two or more pattern sets; for each pattern set, assign at least two of a second set including: D) a score responsive to how regularly said pattern set appears in at least some of the file; E) a score responsive to the ratio of a number times the pattern set corresponds to a different portion of the file in at least some of the file to a number of all portions in said some of the file; and F) a score responsive to a number of times said pattern set corresponds to portions in at least some of the file; select two or more fewer than all of the two or more pattern sets responsive to the at least two scores assigned; provide for display, results of an application of each of the selected plurality of fewer than all of the two or more pattern sets to each of at least one portion of the file; receive a selection of one of the selected plurality of fewer than all of the two or more pattern sets for which results were provided for display; and parse the field in the file responsive to the one of the selected plurality of fewer than all of the two or more pattern sets for which results were provided for display, in each of the two or more the portions of the file.

The computer program product includes an optional feature, whereby the at least one rule or pattern set that describes the part of the portion that comprises the subset comprises at least two of a third set including: G) a rule or pattern describing a leftmost portion of the subset; H) a rule or pattern describing a rightmost portion of the subset; and I) a rule or pattern describing all of the subset.

The computer program product includes an optional feature, whereby: the first set comprises at least one of components A and B; and at least one of component A and component B is identified using a direction outward from the subset.

The computer program product includes an optional feature, whereby, for at least one of the two or more pattern sets, the computer readable program code devices configured to cause the computer system to select or the computer readable program code devices configured to cause the computer system to display are responsive to a type of at least one of the at least one rule or pattern assigned to the pattern set.

The computer program product: optionally additionally includes computer readable program code devices configured to cause the computer system to assign at least one token representing at least one character in the file; and includes an optional feature, whereby at least one of the at least one rule or pattern is identified responsive to at least one token assigned.

The computer program product, optionally additionally includes computer readable program code devices configured to cause the computer system to display the pattern sets corresponding to the results displayed.

The computer program product includes an optional feature, whereby the computer readable program code devices configured to cause the computer system to select the two or more fewer than all of the two or more pattern sets or the computer readable program code devices configured to cause the computer system to display the results are additionally responsive to, for at least one of the two or more pattern sets selected or for which results are displayed, a measure of portions of the file to which said pattern set corresponds, and a threshold.

What is claimed is:

1. A method of parsing a file, comprising:
   retrieving from a file storage, a subset of a file stored in the file storage;
   sending for display, via a user interface of a client device, the subset of the file;
   receiving, via the user interface of the client device, a selection of a set of contiguous characters of the subset of the file;
   determining a plurality of pattern sets, each pattern set comprising one or more patterns, each pattern describing one or more of a left set of contiguous characters occurring to the left of the selected set of contiguous characters, a right set of contiguous characters occurring to the right of the selected set of contiguous characters, and the selected set of contiguous characters;
   for each of the plurality of pattern sets, assigning a plurality of scores comprising:
      a first score indicative of regularity of the pattern set in rows of the file,
      a second score indicative of a number of times the pattern set occurs in each row of the file, and
      a third score indicative of uniformity of matches of the pattern set per row based on a deviation from an average number of matches per row of the file;
   selecting a subset of the plurality of pattern sets based on the scores;
   providing for display, via the user interface of the client device, results of an application of each of the selected subset of the plurality of pattern sets to each of at least one portion of the file;
   receiving, via the user interface of the client device, a selection of one of the subset of the plurality of pattern sets for which results were provided for display; and
   parsing the file using the selected pattern set.

2. The method of claim 1, further comprising:
   generating a tokenized version of at least a portion of the file, the tokenized version including a set of before tokens based on the left set of contiguous characters, a set of after tokens based on the right set of contiguous characters, and a set of selected tokens based on the selected set of contiguous characters.

3. The method of claim 1, wherein the first score is based on a number of non-matching rows between rows that matched the selected pattern set for each pair of rows nearest to one another.

4. The method of claim 1, further comprising:
   providing to the user interface of the client device, information describing the selected subset of the plurality of pattern sets, the user interface configured to receive a selection of a pattern set.

5. The method of claim 1, further comprising:
   generating a new file based on data obtained by parsing the file; and
   providing the new file as input to a program configured to analyze data obtained from the file.

6. A non-transitory computer readable storage medium storing instructions that when executed by a computer processor cause the computer processor to perform:
   retrieving from a file storage, a subset of a file stored in the file storage;
   sending for display, via a user interface of a client device, the subset of the file;
   receiving, via the user interface of the client device, a selection of a set of contiguous characters of the subset of the file;
   determining a plurality of pattern sets, each pattern set comprising one or more patterns, each pattern describing one or more of a left set of contiguous characters occurring to the left of the selected set of contiguous characters, a right set of contiguous characters occurring to the right of the selected set of contiguous characters, and the selected set of contiguous characters;
   for each of the plurality of pattern sets, assigning a plurality of scores comprising:
      a first score indicative of regularity of the pattern set in rows of the file, a second score indicative of a number of times the pattern set occurs in each row of the file, and a third score indicative of uniformity of matches of the pattern set per row based on a deviation from an average number of matches per row of the file;

selecting a subset of the plurality of pattern sets based on the scores;

providing for display, via the user interface of the client device, results of an application of each of the selected subset of the plurality of pattern sets to each of at least one portion of the file;

receiving, via the user interface of the client device, a selection of one of the subset of the plurality of pattern sets for which results were provided for display; and parsing the file using the selected pattern set.

7. The non-transitory computer readable storage medium of claim 6, wherein the stored instructions cause the computer processor to further perform:

generating a tokenized version of at least a portion of the file, the tokenized version including a set of before tokens based on the left set of contiguous characters, a set of after tokens based on the right set of contiguous characters, and a set of selected tokens based on the selected set of contiguous characters.

8. The non-transitory computer readable storage medium of claim 6, wherein the first score is based on a number of non-matching rows between rows that matched the selected pattern set for each pair of rows nearest to one another.

9. The non-transitory computer readable storage medium of claim 6, wherein the stored instructions cause the processor to further perform:

providing to the user interface of the client device, information describing the selected subset of the plurality of pattern sets, the user interface configured to receive a selection of a pattern set.

10. The non-transitory computer readable storage medium of claim 6, wherein the stored instructions cause the computer processor to further perform:

generating a new file based on data obtained by parsing the file; and providing the new file as input to a program configured to analyze data obtained from the file.

11. A computer system, comprising:

a computer processor; and a non-transitory computer readable storage medium storing instructions that when executed by a processor cause the computer processor to perform:

retrieving from a file storage, a subset of a file stored in the file storage;

sending for display, via a user interface of a client device, the subset of the file;

receiving, via the user interface of the client device, a selection of a set of contiguous characters of the subset of the file;

determining a plurality of pattern sets, each pattern set comprising one or more patterns, each pattern describing one or more of a left set of contiguous characters occurring to the left of the selected set of contiguous characters, a right set of contiguous characters occurring to the right of the selected set of contiguous characters, and the selected set of contiguous characters;

for each of the plurality of pattern sets, assigning a plurality of scores comprising:

a first score indicative of regularity of the pattern set in rows of the file, a second score indicative of a number of times the pattern set occurs in each row of the file, and a third score indicative of uniformity of matches of the pattern set per row based on a deviation from an average number of matches per row of the file;

selecting a subset of the plurality of pattern sets based on the scores;

providing for display, via the user interface of the client device, results of an application of each of the selected subset of the plurality of pattern sets to each of at least one portion of the file;

receiving, via the user interface of the client device, a selection of one of the subset of the plurality of pattern sets for which results were provided for display; and parsing the file using the selected pattern set.

12. The computer system of claim 11, wherein the stored instructions cause the computer processor to further perform:

generating a tokenized version of at least a portion of the file, the tokenized version including a set of before tokens based on the left set of contiguous characters, a set of after tokens based on the right set of contiguous characters, and a set of selected tokens based on the selected set of contiguous characters.

13. The computer system of claim 11, wherein the first score is based on a number of non-matching rows between rows that matched the selected pattern set for each pair of rows nearest to one another.

14. The computer system of claim 11, wherein the stored instructions cause the processor to further perform:

providing to the user interface of the client device, information describing the selected subset of the plurality of pattern sets, the user interface configured to receive a selection of a pattern set.

15. The computer system of claim 11, wherein the stored instructions cause the computer processor to further perform:

generating a new file based on data obtained by parsing the file; and providing the new file as input to a program configured to analyze data obtained from the file.

\* \* \* \* \*